(12) United States Patent
Bordawekar et al.

(10) Patent No.: US 8,285,711 B2
(45) Date of Patent: Oct. 9, 2012

(54) OPTIMIZING QUERIES TO HIERARCHICALLY STRUCTURED DATA

(75) Inventors: Rajesh Bordawekar, Yorktown Heights, NY (US); Anastasios Kementsietsidis, New York, NY (US); Bryant Wei Lun Kok, Singapore (SG); Lipyeow Lim, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/624,675

(22) Filed: Nov. 24, 2009

(65) Prior Publication Data
US 2011/0125730 A1   May 26, 2011

(51) Int. Cl.
G06F 17/30 (2006.01)
(52) U.S. Cl. ........ 707/718; 707/759; 707/760; 707/770; 707/769; 707/713; 707/719
(58) Field of Classification Search .................. 707/759, 707/760, 770, 769, 713, 718–719
See application file for complete search history.

(56) References Cited

U.S. PATENT DOCUMENTS

| | | | |
|---|---|---|---|
| 5,819,255 A * | 10/1998 | Celis et al. ............................. | 1/1 |
| 5,822,747 A * | 10/1998 | Graefe et al. .......................... | 1/1 |
| 6,021,405 A * | 2/2000 | Celis et al. ............................. | 1/1 |
| 6,345,267 B1 * | 2/2002 | Lohman et al. ........................ | 1/1 |
| 6,567,803 B1 * | 5/2003 | Ramasamy et al. ................... | 1/1 |
| 6,915,291 B2 * | 7/2005 | Carlson et al. ......................... | 1/1 |
| 7,281,000 B2 * | 10/2007 | Kapoor et al. ......................... | 1/1 |
| 7,818,313 B1 * | 10/2010 | Tsimelzon et al. ........... | 707/718 |
| RE42,664 E * | 8/2011 | Hallmark et al. ............. | 707/636 |
| 8,126,870 B2 * | 2/2012 | Chowdhuri et al. .......... | 707/713 |
| 2003/0229627 A1 * | 12/2003 | Carlson et al. .................... | 707/3 |
| 2006/0218123 A1 * | 9/2006 | Chowdhuri et al. ............. | 707/2 |
| 2007/0239673 A1 * | 10/2007 | Barsness et al. ................... | 707/3 |
| 2010/0042607 A1 * | 2/2010 | Min et al. ........................... | 707/5 |
| 2011/0125730 A1 * | 5/2011 | Bordawekar et al. ......... | 707/718 |

OTHER PUBLICATIONS

"Extensible Markup Language (XML) 1.0 (Fifth Edition)," W3C Recommendation, Nov. 26, 2008, 63 pages.
"XML Path Language (XPath) 2.0," W3C Recommendation, Jan. 23, 2007, 117 pages.
"XML Query Language (XQuery) 1.0," W3C Recommendation, Jan. 23, 2007, 207 pages.
A. Aboulnaga et al., "Estimating the Selectivity of XML Path Expressions for Internet Scale Applications," Proceedings of the 27th VLDB Conference, 2001, pp. 591-600, Roma, Italy.
L. Lim et al., "XPathLearner: An On-Line Self-Tuning Markov Histogram for XML Path Selectivity Estimation," Proceedings of the 28th VLDB Conference, 2002, 12 pages, Hong Kong, China.

* cited by examiner

Primary Examiner — Frantz Coby
(74) Attorney, Agent, or Firm — Louis J. Percello; Ryan, Mason & Lewis, LLP

(57) ABSTRACT

Techniques are disclosed for optimizing queries to hierarchically structured data. For example, a method for processing a query directed to data having a hierarchical structure with a plurality of data nodes comprises the following steps. One or more structural attributes describing the hierarchical structure of the data are identified. The query is partitioned into two or more query partitions using at least one of the one or more identified structural attributes. A parallel execution plan is determined for the query by splitting into components one or more of: the query into at least two of the query partitions; and the hierarchical structure of the data. The split components are executed in parallel on different computer processes according to the parallel execution plan.

19 Claims, 8 Drawing Sheets

200

300

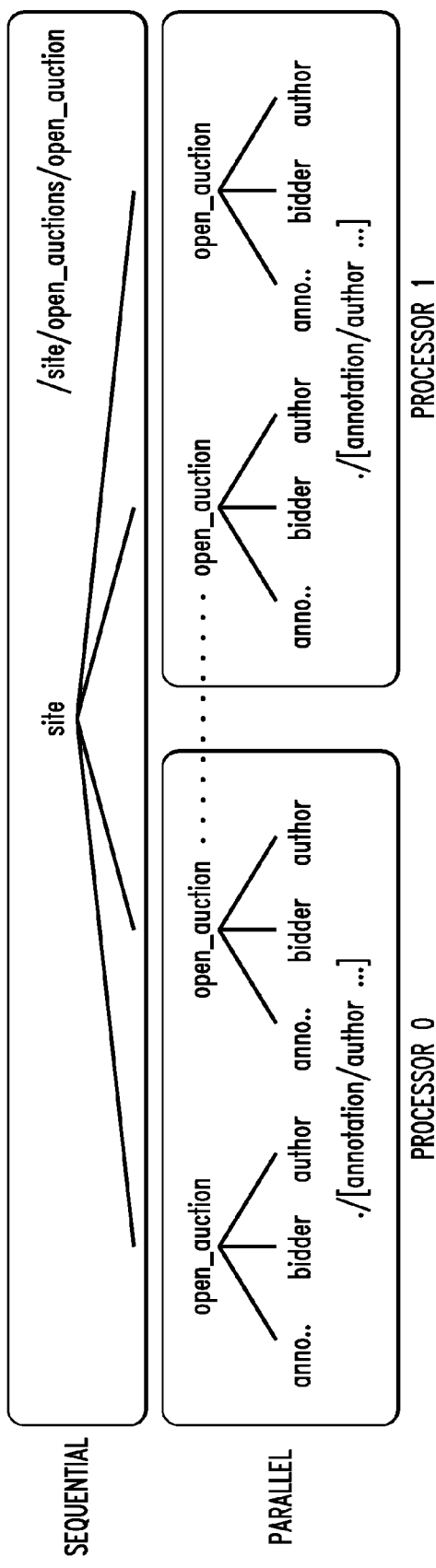
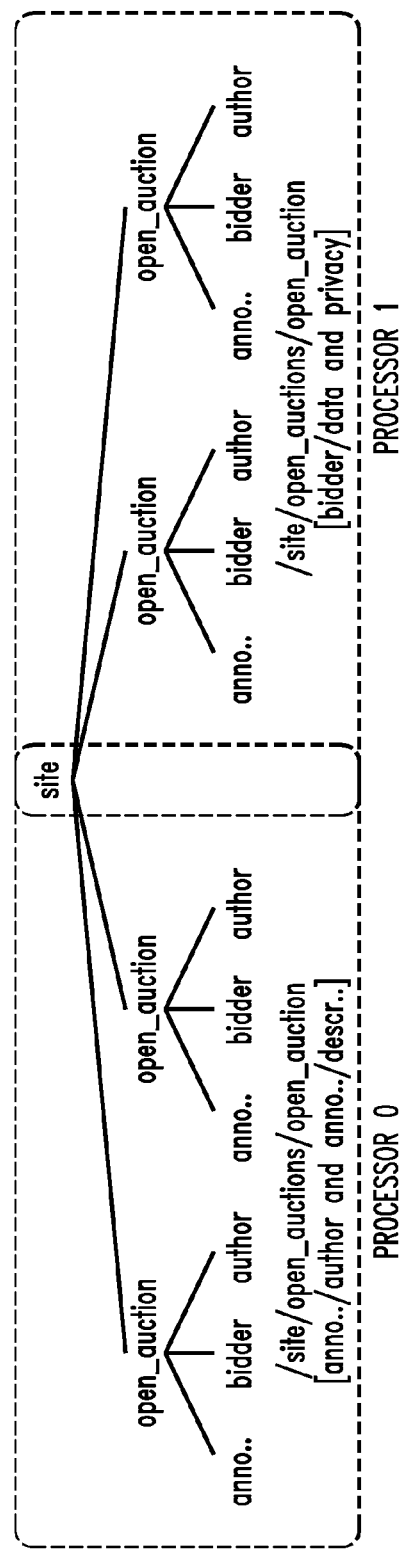
FIG. 4

FIG. 6

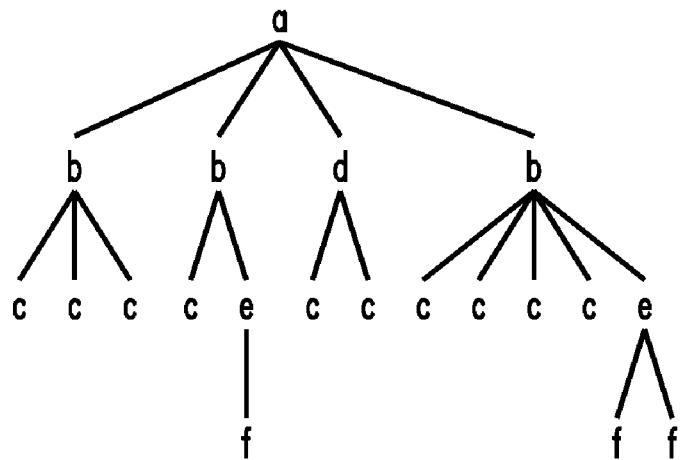

FIG. 7
700

| Algorithm 1 OPTIMIZER(*xpath*, *S*) |
|---|
| Input: XPath Expression *xpath*, Data Statistics *S* <br> Output: multi-threaded query plan <br> 1: $Q \leftarrow$ XPathParser(*xpath*) <br> 2: $\mathcal{P} \leftarrow \emptyset$ <br> 3: ANNOTATEQUERYTREE($Q$, FirstStep($Q$), $S$, $\mathcal{P}$) <br> 4: /* Choose Partitioning Points */ <br> 5: Sort $\mathcal{P}$ by depth and parallel cost <br> 6: $\mathcal{P}_{opt} \leftarrow$ Pick top $k$ points according to heuristics (Sec. 5.2) <br> 7: *Plan* $\leftarrow$ Construct parallel plan using $\mathcal{P}_{opt}$ |

FIG. 8
800

| Algorithm 2 ANNOTATEQUERYTREE($Q$) |
|---|

Input: Abstract Query Tree $Q$, Current Node $t_i$, Data Statistics $S$, Current set of candidates $\mathcal{P}$

Output: Selectivity at $t_i$, Cost estimate at $t_i$, adds candidates to $\mathcal{P}$ 1:    $minpredsel \leftarrow \infty$
2:    $(sumpredcost, sumntwigs, QPcost) \leftarrow (0, 0, 0)$
3:    if $t_i$ is the end of list symbol then
4:       return $(1,0)$
5:    if $t_i$ is root then
6:       $sel \leftarrow 1$
7:       $card \leftarrow 1$
8:    else if $t_i$ is a step then
9:       $sel \leftarrow \min(f(t_i | t_{i-1}), 1.0)$
10:      $card \leftarrow card(t_{i-1}) \cdot f(t_i | t_{i-1})$
11:      for all $p \in Predicates(t_i)$ do
12:        $(predsel, predcost, predQPcost, ntwigs) \leftarrow$
             ANNOTATEQUERYTREEPRED($Q, p, S, \mathcal{P}$)
13:        $sumntwigs \leftarrow sumntwigs + ntwigs$
14:        $QPcost \leftarrow \max(QPcost, predQPcost)$
15:        $minpredsel \leftarrow \min(minpredsel, predsel)$
16:        $sumpredcost \leftarrow sumpredcost + predcost$
17:      if $sumpredcost > 0$ then
18:        $cardWithPred \leftarrow card \cdot minpredsel$
19:        $QPcost \leftarrow QPcost + sumntwigs * C_{par}$
20:      $(rsel, rcost) \leftarrow$ ANNOTATEQUERYTREE($Q, t_{i+1}, S, \mathcal{P}$)
21:      $sel \leftarrow sel \cdot \min(rsel, minpredsel)$
22:      $cost \leftarrow f(t_i | t_{i-1}) \cdot [sumpredcost + rcost + C_{step} \cdot f(* | t_i)]$
      /* Logic for DP candidacy */
23:      if $card \geq minCardForDP$ then
24:        $DPcost \leftarrow$ Eqn. 10
25:        if $DPcost < cost$ then
26:          $\mathcal{P} \leftarrow \mathcal{P} \cup t_i$ {/* add $t_i$ as a DP candidate */}
      /* Logic for QP candidacy */
27:      if $sumntwigs > 0$ then
28:        $QPcost \leftarrow card \cdot [QPcost + rcost + C_{step} \cdot f(* | t_i)]$
29:        if $QPcost < cost$ then
30:          $\mathcal{P} \leftarrow \mathcal{P} \cup t_i$ {/* add $t_i$ as QP candidate */}
31:      $card(t_i) \leftarrow cardWithPred$
32:      return $(sel, cost)$

FIG. 9
900

| Algorithm 3 ANNOTATEQUERYTREEPRED($Q, p_i, S, \mathcal{P}$) |
|---|
| Input: Abstract Query Tree $Q$, Current Predicate Expression Node $p_i$, Data Statistics $S$, Current candidates $\mathcal{P}$ |
| Output: Selectivity *sel*, Sequential cost *cost*, QP cost *predQPcost*, QP branches *ntwigs*, adds candidates to $\mathcal{P}$ |
| 1:   if $p_i$ is a simple xpath expression then |
| 2:      (*sel, cost*) ← ANNOTATEQUERYTREE($Q, Expr(p_i), S, \mathcal{P}$) |
| 3:      return (*sel, cost, cost,* 1) |
| 4:   else if $p_i$ is a boolean expression then |
| 5:      (*lhssel, lhscost, lhsQPcost, lhsntwigs*) ← <br>        ANNOTATEQUERYTREEPRED($Q, LeftExpr(p_i), S, \mathcal{P}$) |
| 6:      (*rhssel, rhscost, rhsQPcost, rhsntwigs*) ← <br>        ANNOTATEQUERYTREEPRED($Q, RightExpr(p_i), S, \mathcal{P}$) |
| 7:     if boolean operator is AND then |
| 8:        *sel* ← min(*lhssel, rhssel*) |
| 9:        *predQPcost* ← max(*lhsQPcost, rhsQPcost*) + (*lhssel* + <br>        *rhssel*) · *ANDoverhead* |
| 10:     else if boolean operator is OR then |
| 11:        *sel* ← max(*lhssel, rhssel*) |
| 12:        *predQPcost* ← max(*lhsQPcost, rhsQPcost*) + (*lhssel* + <br>        *rhssel*) · *ORoverhead* |
| 13:     return (*sel, lhscost+rhscost, predQPcost, lhsntwigs+rhsntwigs*) |

OPTIMIZING QUERIES TO HIERARCHICALLY STRUCTURED DATA

FIELD OF THE INVENTION

The present invention relates to processing of hierarchically structured data and, more particularly, to techniques for optimizing queries to hierarchically structured data.

BACKGROUND OF THE INVENTION

For a number of years, the evolution of hardware systems followed a rather predictable trend in terms of processing capabilities: the latest generation of processors was significantly faster than the previous, with the rate of speed increase following closely Moore's law. However, higher processor speeds did not always translate to corresponding gains in system performance (with memory speeds and instruction sets often becoming the new performance bottlenecks). This led hardware manufactures to consider alternative architectures in which multiple processing cores are used to execute instructions in parallel. So, whereas the trend before was to increase processor speeds between hardware generations, in the last few years a new trend has emerged where the difference between hardware generations is in the number of cores. Nowadays, it is not uncommon to find eight cores, even in commodity hardware.

Of course, to take advantage of these multiple cores, the parallelization of existing software systems comes at a cost. Existing software systems often cannot be used in a processing environment that employs parallelization and may need to be changed. Indeed, there has been much interest in systems research, including database systems research, on how to harness such parallel processing power.

It is known that the Extensible Markup Language (XML) is the de facto data representation format used today, particularly in database systems. XML is defined by WWW Consortium, "Extensible Markup Language (XML) 1.0 (Fifth Edition)," W3C Recommendation, Nov. 26, 2008, the disclosure of which is incorporated by reference herein. XPath queries, based on the XML Path Language as defined by WWW Consortium, "XML Path Language (XPath) 2.0," W3C Recommendation, Jan. 23, 2007, the disclosure of which is incorporated by reference herein, are commonly used to query XML data alone or as part of XQuery expressions. Note that XPath 2.0 is a subset of XQuery 1.0 as defined by WWW Consortium, "XML Query Language (XQuery) 1.0," W3C Recommendation, Jan. 23, 2007, the disclosure of which is incorporated by reference herein Thus, in a multi-core system, effective parallel query evaluation (such as XPath queries) over XML documents is a problem that it would be highly desirable to address and solve.

SUMMARY OF THE INVENTION

Principles of the invention provide techniques for optimizing queries to hierarchically structured data.

For example, in one aspect, a method for processing a query directed to data having a hierarchical structure with a plurality of data nodes comprises the following steps. One or more structural attributes describing the hierarchical structure of the data are identified. The query is partitioned into two or more query partitions using at least one of the one or more identified structural attributes. A parallel execution plan is determined for the query by splitting into components one or more of: the query into at least two of the query partitions; and the hierarchical structure of the data. The split components are executed in parallel on different computer processes according to the parallel execution plan.

The computer processes may be computer processors and computer programs. The splitting may comprise counting the number of data nodes in the hierarchically structured data for one or more node types that are referenced in the query. The split may be controlled by an optimizing function. The parallel execution plan may split only the hierarchical structure of the data. The parallel execution plan may split only the query into at least two partitions. The parallel execution plan may split both the hierarchical structure of the data and the query.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIGS. 4(*a*) and (*b*) show execution of the XPath query presented in FIG. 1(*c*) using a data partitioning approach and a query partitioning approach, respectively.

FIG. 6 shows an example of an XML data tree for use in explaining cardinality and selectivity according to an embodiment of the invention.

FIG. 7 shows an algorithm for use in optimizing a query according to an embodiment of the invention.

FIG. 8 shows an algorithm for use with the algorithm of FIG. 7

FIG. 9 shows another algorithm for use with the algorithm of FIG. 7

DETAILED DESCRIPTION OF PREFERRED EMBODIMENTS

While illustrative embodiment of the invention will be described below in the context of parallelizing XPath queries over XML data, it is to be understood that principles of the invention may be more generally applied to optimization of other types of queries over other forms of hierarchically structured data.

Figure 1:
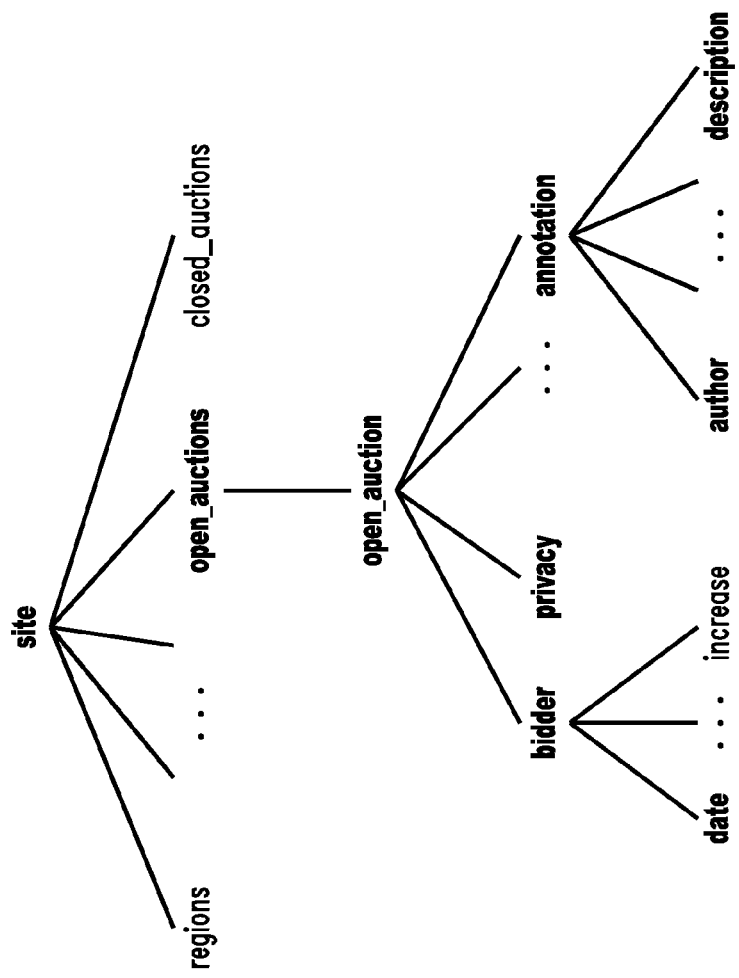
FIGS. 1(*a*) through (*c*) shows an XML document, tree, and XPath query, respectively, for use in explaining illustrative principles of the invention.

By way of illustration, consider the XML document in FIG. 1(*a*) whose document tree is shown in FIG. 1(*b*). Note that this example conforms to XMark, i.e., defined as part of the XML Benchmark Project, Amsterdam, The Netherlands, 2001. Assume that one wants to evaluate the XPath query /site/regions/* to retrieve the names of all regions from the XML document (where * denotes the wildcard and can match any element). A question arises as to whether or not the evaluation of the query should be parallelized. It is realized that such a decision depends both on the query itself and on the characteristics of the document. In XMark, there are usually only a limited number of region nodes, each corresponding to a continent. Therefore, a query will access only a small number of nodes in the XML document. Given that any form of parallelism is expected to also incur some cost in the evaluation, it seems that in this particular setting any benefits from parallelism are either insignificant or are alleviated by the cost of parallelism. Therefore, a serial execution seems preferable. However, consider a situation where a region node exists for each county in the United States. Then, with approximately 3,000 possible region nodes, for the same query it seems reasonable to try to parallelize the evaluation of the query by considering, in parallel, all the regions by state. In general, given a document and a query, a first challenge is to decide whether or not to parallelize the evaluation of the query.

For the simple example query, once the decision is made to parallelize, it is rather straightforward to decide how the query is parallelized: each core evaluates the initial query over a subset of the regions (i.e., document), which is an example of what is called a data partitioning parallelization strategy. In reality, however, there will be multiple ways to parallelize a query, each of which might use a different strategy. To see this, consider for example the XPath query in FIG. 1(c). Assuming that there is a large number of open_auction nodes in the document, one might decide to parallelize on the third step of the query (hereafter referred to as a partitioning point). Data partitioning here dictates that the first three steps of the query be sequentially evaluated and then each core evaluates the predicate over a subset of the open_auction nodes retrieved by the serial evaluation. However, another parallelization strategy is also possible here. Using the query partitioning parallelization strategy, the initial query can be rewritten into three new queries, with each of the three predicates of the initial query appearing in only one of the resulting queries. For example, /site/open_auctions/open_auction[annotation/author] is one of the three queries. Then, each rewritten query is evaluated by a different core and the final result is computed by the intersection of results in all the cores.

Given the two alternative strategies, the question arises as to how to choose which one to use to parallelize the query. Even if it is clear that one of the two strategies is the most promising, a question arises as to how can one be certain that parallelizing the initial query at a different step, say, in annotation might not give better response times. In general, for an XPath query with a total of n steps (including steps within predicates), each step could be a candidate partitioning point for parallelization. A parallel query plan might contain a subset of the partitioning points. Hence, the number of possible parallel query plan is $\mathcal{O}(2^n)$. For a given subset of partitioning points, the parallelization strategy at each point and the order of the partitioning points may further result in different parallelization plans. Coming up with a way to systematically search and find acceptable parallelization plans in this large search space is a second challenge to be addressed. Therefore, a main objective of the invention is to provide a solution that uses a cost-based approach to distinguish between alternative plans. Coming up with an appropriate cost-model for the parallelization of XPath queries is a third challenge.

To address these and other challenges, illustrative principles of the invention provide methodologies for optimizing XPath queries on shared memory, multi-core processors. In one or more embodiments, one or more optimization algorithms are provided that employ a cost model together with one or more heuristics to find and select parallelization points in an XPath query. Once the parallelization points are selected, one or more parallel query plans are generated and executed. The methodologies (algorithms) are implemented in an optimization module (optimizer) that is part of a database system that executes on a multi-core processing system.

Figure 2:
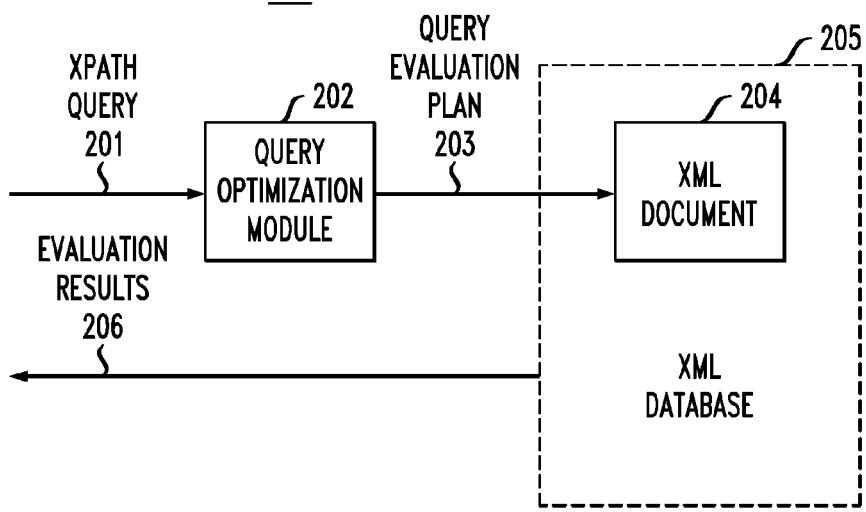
FIG. 2 shows a database system that implements a query optimizer according to an embodiment of the invention.

FIG. 2 shows a database system 200 that implements such an optimizer according to an embodiment of the invention. As generally shown, an XPath query 201 is input to an optimization module 202. The optimization module 202 generates a query evaluation plan 203 (as will be generally described below in the context of FIG. 3, and described in further detail in the context of algorithms 1, 2 and 3 below). The query evaluation plan 203 is executed over the subject XML document 204, wherein the document 204 is part of an XML database 205. Evaluation results 206 are then returned to the system or user that issued the XPath query 201, and/or to some other system or individual.

Figure 3:
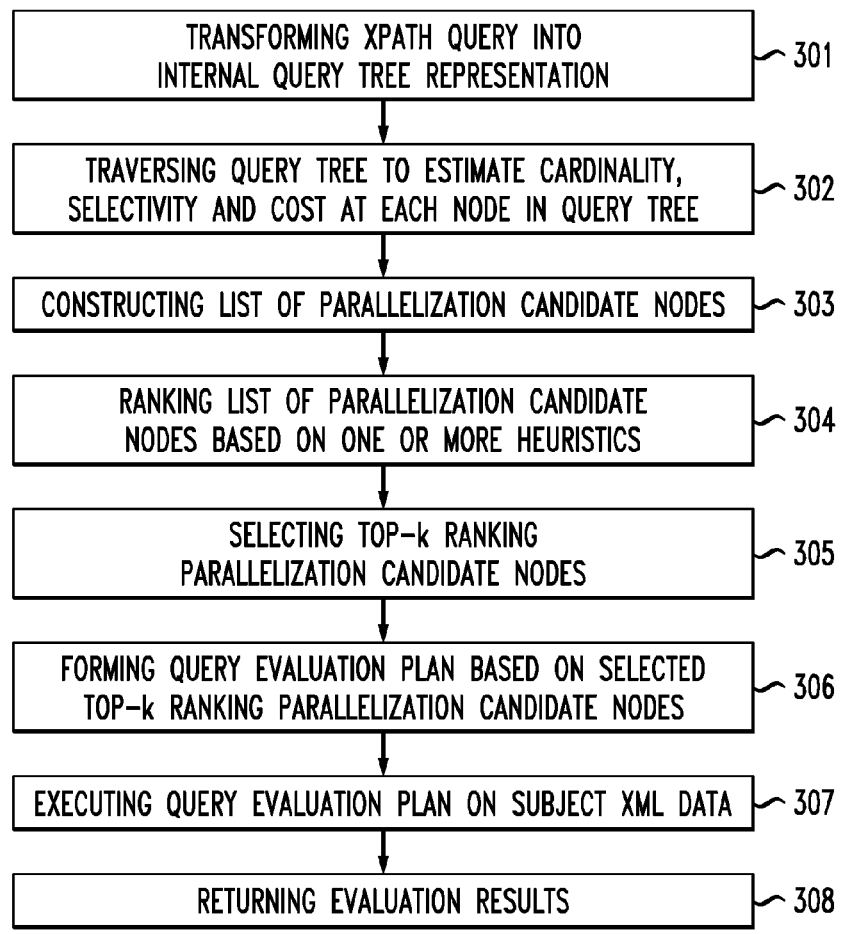
FIG. 3 shows a query optimization method according to an embodiment of the invention.

FIG. 3 shows a query optimization method 300 according to an embodiment of the invention. As generally shown, method 300 may be implemented by database system 200 of FIG. 2.

In step 301, the XPath query is transformed into an internal query tree representation. In step 302, the query tree is traversed to estimate cardinality, selectivity and cost at each node in query tree. A list of parallelization candidate nodes is constructed in step 303. The parallelization candidate nodes are determined by applying one or more partitioning strategies including query partitioning, data partitioning, or a hybrid (query/data) partitioning. Step 304 ranks the list of parallelization candidate nodes based on one or more heuristics. In step 305, the top-k ranking parallelization candidate nodes are selected. A query evaluation plan is formed in step 306 based on the selected top-k ranking parallelization candidate nodes. Note that more than one query evaluation plan can be formed in step 306, and plans can also be combined. From the multiple plans, one query evaluation plan is selected. Step 307 executes the selected query evaluation plan on the subject XML data (document). The results of the evaluation of the query evaluation plan are returned in step 308. These steps will be further explained in the descriptions that follow.

As mentioned, in accordance with one or more embodiments of the invention, the query to be optimized is an XPath query. We now briefly review the fragment of XPath considered in an illustrative embodiment. Note again that principles of the invention are not limited to this type of query.

In one embodiment, we consider the class $\mathcal{Q}$ of XPath queries of the form:

$$\mathcal{Q} ::= \epsilon \mid t \mid * \mid \mathcal{Q} / \mathcal{Q} \mid \mathcal{Q}_{[p]},$$

$$p ::= \mathcal{Q} \mid \mathcal{Q}/\text{text}(\ )=\text{'}c\text{'} \mid \mathcal{Q}/\text{label}(\ )=l \mid \mathcal{Q}/\text{pos}(\ ) \text{ op } i \mid$$
$$\mathcal{Q} \wedge \mathcal{Q} \mid \mathcal{Q} \vee \mathcal{Q}$$

where $\epsilon$ is the empty path (self), t is a tag, * is a wildcard (matches any tag), and '/' is the child-axis; [p] is referred to as a predicate, in which $\mathcal{Q}$ is an expression, c and l are string constants, op op is any one of $\leq, \geq, <>=$, i is an integer, and $\wedge, \vee$ are the Boolean conjunction and disjunction, respectively. Note that, in this illustrative embodiment, we are considering only queries with downward modalities, since these are the most commonly used in practice. However, principles of the invention are not so limited. These queries support complex nested predicates, which include boolean combinations of sub-predicates, and tests on label names, contents and positions. Below the processing of a query $\mathcal{Q}$ is distinguished from that of its predicates at the various query steps.

It is realized that there are three strategies for parallelizing individual XPath queries: (1) data partitioning; (2) query partitioning; and (3) hybrid partitioning. The three parallelization strategies are defined over an abstract XML data model. As a result, they apply to any storage implementation of the XML data model. In this embodiment, it is assumed that the pre-parsed XML document is stored using an in-memory, non-relational representation and it can be concurrently accessed by multiple application threads in a shared-address space environment. The three parallelization strategies differ in the way the shared XML data is logically partitioned across multiple processors and how the input query is executed on the partitioned data. All three strategies require some form of query re-writing.

In the data partitioning approach, the input XPath query is partitioned into serial and parallel queries. The serial part of the input query is executed by a single processor over the entire document. The resulting node set is then equally distributed across multiple processors. Each participating processor then uses the locally assigned node set as the set of context nodes and executes the parallel sub-query. This approach achieves parallelism by concurrently executing the same XPath query on distinct sections of the XML document. The scalability in the data partitioning scheme is determined by the sequential sub-query; an expensive sequential execution can degrade the performance of the entire query. Therefore, in the data partitioning approach, it is important to partition the query so that the serial portion performs the least amount of work.

FIG. 4(a) illustrates the execution of the XPath query presented in FIG. 1 using the data partitioning approach. The original query is split into two sub-queries: a serial sub-query, /site/open_auctions/open_auction and the predicated sub-query, ./[anno . . . and . . . ]. The serial query is executed by a processor and the resulting node set of open_auction nodes is distributed over the participating processors. Each processor then executes the predicated sub-query on its assigned nodes. The result of the original query can then be computed by merging local results from participating processors.

In the query partitioning approach, the input query is rewritten into a set of queries that can ideally navigate different sections of the XML tree. The number of sub-queries matches the number of participating processors. In many cases, the modified query is an invocation of the original query using different parameters. Each processor executes its assigned query on the entire XML document. The final result of the query can be then computed using either the union or merge of the per-processor node sets. Unlike the data partitioning approach, this approach achieves parallelism via exploiting potentially non-overlapping navigational patterns of the queries. In this approach, the overall scalability is determined by the range of the concurrent queries. If their traversals do not overlap significantly, the query performance will scale as the number of processors is increased.

FIG. 4(b) illustrates the execution of the XPath query presented in FIG. 1 using the query partitioning approach. In this scenario, the original query is re-written into two distinct predicated queries, each executing a part of the original predicate. Each new query is executed by a separate processor over the entire XML document. The final result is computed by intersecting two local result sets. Alternatively, the query partitioning approach rewrites a query using range partitioning. For example, consider the query, /a/b, where the node a has 20 b children. The query partitioning strategy can rewrite this query for two processors by partitioning the node b's node set by two, i.e., processor 0 will execute the query, /a/b[position( )11], and processor 1 will execute the query, /a/b[position( )10]. Note that the execution pattern of such plan is very similar to the data partitioning plan.

Figure 5:
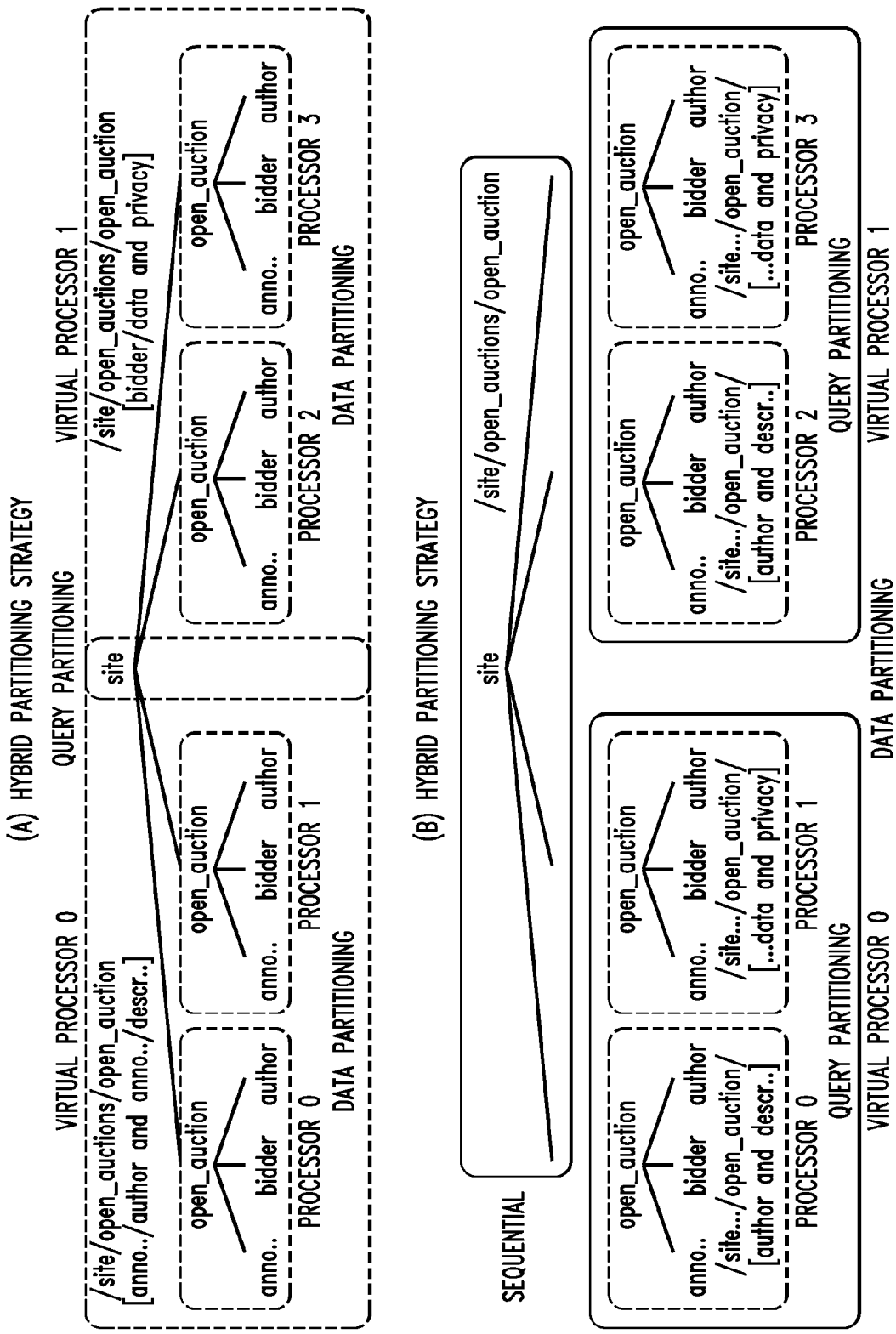
FIGS. 5(*a*) and (*b*) show execution of the XPath query presented in FIG. 1(*c*) using a first hybrid partitioning approach and a second hybrid partitioning approach, respectively.

The data and query partitioning approach can be integrated into a hybrid partitioning approach. FIG. 5 illustrates two possible implementations of the XPath query using the hybrid partitioning approach. In a first implementation, as shown in FIG. 5(a), the input query is first re-written using the query partitioning approach for a set of virtual processors for the entire XML document. Each virtual processor is a set of physical processors and it executes its assigned query using the data partitioning approach. Specifically, if the virtual processor consists of two physical processors, one of the processors will first execute the serial portion of the assigned query and then the two processors will concurrently execute the parallel portion of the query using their allocated context nodes.

Alternatively, the input query can be first re-written using the data partitioning strategy over a set of virtual processors and the parallel sub-query can be then executed using query partitioning strategy over the physical processors within a virtual processor as shown in FIG. 5(b). The hybrid partitioning strategy is a generalized form of the query and data partitioning strategy and can be used recursively.

In accordance with illustrative principles of the invention, the optimization module or optimizer (202 in FIG. 2) uses a cost-based model together with heuristics in order to find an efficient parallel query plan. Recall that the search space of all possible query plans (parallel and sequential) is super-exponential. A cost model is used to quickly evaluate a candidate plan (or relevant portions of a plan) to determine if it is likely to be an efficient plan. However, running the cost model on every possible plan in the search space is infeasible. Hence, illustrative principles of the invention use heuristics in combination with the cost model to prune the search space.

It is realized that the following factors affect the parallelization decision:
  cardinality of a step: if there are too few node instances matching a particular step, performing parallelization via data partitioning at that step is not feasible.
  number of branches in the predicates of a step: If there are no predicates or very few branches in the predicate, performing parallelization via query partitioning at that step is not feasible.
  amount of work done via sequential and via parallel processing: For overall speedup, the sequential work should be minimized and the maximum amount of work parallelized.

In one embodiment, the cost model quantifies the processing cost of three basic ways of processing an XPath query: sequential, data partitioning, and query partitioning. The cost functions for data partitioning and query partitioning both rely on the cost function for sequential processing. Key components of these functions are the notions of cardinality and selectivity, as will be explained below.

We first summarize the statistics that may be used by a cost model and optimizer according to one embodiment. In this embodiment, it is assumed that three types of statistics are collected:
  Single tag count $f(t_i)$ counts the number of node instances in the XML data tree that matches the tag $t_i$;
  Fanout count $f(t_i|t_{i-1})$ counts the average number of child node instances matching $t_i$ for each parent node matching $t_{i-1}$; and Children count $f(*|t_{i-1})$ counts the average number of child node instances (regardless of tag) for each parent node matching $t_{i-1}$.

Although we use a first order Markov model for the statistics in this embodiment, it is to be understood that the optimizer is general and higher order Markov models or other models can be used as well. Under this simplifying assumption, to compute the above three statistics, it is sufficient to collect single tag and tag-tag pair counts. Further details of such known statistics may be found in A. Aboulnaga, A. R. Alameldeen and J. F. Naughton, "Estimating the Selectivity of XML Path Expressions for Internet Scale Applications," VLDB, pp. 591-600, 2001; and L. Lim, M. Wang, S. Padmanabhan, J. S. Vitter and R. Parr, "XPathLearner: An Online Self-Tuning Markov Histogram for XML Path Selectivity Estimation," VLDB, 2002, the disclosures of which are incorporated by reference herein in their entirety. Principles of the invention are not limited to these specific statistics.

The collected statistics are used to estimate the cardinality of each step in an XPath expression. The cardinality of a step in an XPath expression is the number of nodes in the XML data tree that satisfy the conditions of that step.

EXAMPLE 1

Consider the XML data tree in FIG. 6. The cardinalities of /a, /a/b and /a/b/c are 1, 3, and 8, respectively.

Consider an XPath expression $Q=/t_0/t_1/\ldots/t_i/\ldots/t_k$ (with no predicates for now), where each $t_i$ is either a tag or the wildcard *. Let $Q_i$ denote the sub-expression of $Q$ up to step $t_i$. Then, the cardinality of $Q_i$ is estimated by the recurrence relation:

$$\text{card}(Q_i) = \begin{cases} 1 & \text{if } i = 0 \\ f(t_i/t_{i-1})\text{card}(Q_{i-1}) & \text{otherwise} \end{cases} \quad (1)$$

EXAMPLE 2

Consider again the XML data tree in FIG. 6. The cardinality of /a/b/c can be estimated as:

$$\text{card}(/a/b/c) = f(c | b)\text{card}(/a/b) \quad (2)$$

$$= f(c | b)f(b | a)\text{card}(/a)$$

$$= \frac{8}{3} \times \frac{3}{1} \times 1 = 8$$

Similarly, it follows that the cardinality of /a/b/* is 10.

In order to estimate the cardinality of more complex XPath expressions that contain predicates, the notion of selectivity is introduced. Selectivity is a fraction associated with a predicate that quantifies the filtering power of the predicate.

EXAMPLE 3

Consider again the XML data tree in FIG. 6. The selectivity of predicate [e/f] in /a/b[e/f] is $$\frac{2}{3}.$$

Consider the XPath expression:

$Q=/t_0/t_1/\ldots/t_i[t_{i,0}/t_{i,1}/\ldots/t_{i,j}/\ldots/t_{i,m}]/\ldots/t_k$, and let $Q_i$ denote the subexpression of $Q$ up to step $t_i$. Also, let $p_i$ denote the predicate $t_{i,0}/t_{i,1}/\ldots/t_{i,j}/\ldots/t_{i,m}$ of $t_i$ and $p_{i,j}$ the sub-predicate of $p_i$ up to step $t_{i,j}$. Then, the selectivity of $p_{i,j}$, denoted by $\text{sel}(p_{i,j})$, can be computed using the recurrence relation:

$$\text{sel}(p_{i,j}) = \begin{cases} \min(f(t_{i,0}/t_i), 1.0) & \text{if } j = 0 \\ \min(f(t_{i,j}/t_{i,j-1}), 1.0)\text{sel}(p_{i,j-1}) & \text{otherwise} \end{cases} \quad (3)$$

EXAMPLE 4

Consider again the XML data tree in FIG. 6. The selectivity of predicate p=[e/f] in /a/b [e/f] can be estimated as:

$$\text{sel}(e/f) = \min(f(f | e), 1.0)\text{sel}(e) \quad (4)$$

$$= \min(f(f | e), 1.0)\min(f(e/b), 1.0)$$

$$= \min\left(\frac{3}{2}, 1.0\right)\min\left(\frac{2}{3}, 1.0\right) = \frac{2}{3}$$

When a predicate is a Boolean combination of sub-predicates, the selectivity of the whole expression is computed from the selectivity of the component sub-predicates using the following rules:

$$\text{sel}(p \text{ AND } p') = \min(\text{sel}(p), \text{sel}(p')) \quad (5)$$

$$\text{sel}(p \text{ OR } p') = \max(\text{sel}(p), \text{sel}(p')) \quad (6)$$

where p and p' are the predicate sub-expressions.

Given the selectivity of predicates, we can now refine the cardinality estimation (of Eqn. 1) to account for the presence of predicates. This can be done by multiplying the cardinality of a step with the selectivity of the associated predicate:

$$\text{card}(Q_i[p_i]) = \begin{cases} 1 & \text{if } i = 0 \\ f(t_i/t_{i-1})\text{card}(Q_{i-1}[p_{i-1}])\text{sel}(p_i) & \text{otherwise} \end{cases} \quad (7)$$

Of course, not all steps in a query have predicates. For example, in the query /a/b [e/f], only the second step has a predicate. In order to be able to use the above formula uniformly for all steps of any query, we introduce the notion of the empty predicate [ε] (note that the empty predicate is supported by the query grammar introduced in the previous section). We define the selectivity of the empty predicate to be equal to 1 and therefore any query in our grammar can be rewritten to an equivalent query where each step has a predicate. For example, query /a/b[e/f] can be rewritten to query /a[ε]/b [e[ε]/f[ε]]. Then, Eqn. 7 can be used to compute the cardinality of each step. Hereafter, whenever we compute cardinality, we will always use this formula on queries whose steps always includes (empty) predicates.

With respect to sequential cost, let us consider the XPath expression $Q=/t_0[p_0]/\ldots/t_{i-1}[p_{i-1}]/t_i[p_i]/\ldots/t_k[p_k]$, where each $p_i$ is either a predicate of the query or an introduced empty predicate. Suppose the prefix $Q_{i-1}[p_{i-1}]$ has been processed (all the steps and predicates up and including step $t_{i-1}$) resulting in a node set ). For each node in the node set $\mathcal{N}_{i-1}$, the average cost of traversing the remaining suffix (starting with step $t_i$) of the XPath expression on a single processor model can be estimated by:

$$cost(t_i) = \begin{cases} f(t_i \mid t_{i-1}) & \text{if } i = k \text{ and } p_i = \epsilon \\ f(t_i \mid t_{i-1})[cost(p_i) + f(^* \mid t_i)C_{step}] & \text{if } i = k \text{ and } p_i \neq \epsilon \\ f(t_i \mid t_{i-1})[cost(t_{i+1}) + \\ cost(p_i) + f(^* \mid t_i)C_{step}] & \text{otherwise} \end{cases} \quad (8)$$

where $cost(p_i)$ is the cost of processing the predicate $p_i$, and $C_{step}$ is the overhead associated with processing a step. The intuition for the recursion is as follows. Starting from a single node matching $t_{i-1}$ (henceforth the parent node), there are on average $f(t_i/t_{i-1})$ child nodes that match $t_i$. For each node that matches $t_i$ (henceforth current node), the average cost can be computed as the sum of $cost(t_{i+1})$ (computed recursively), the cost $cost(p_i)$ of processing the predicate pi associated with the current node, and an overhead associated with processing child steps from the current node. In order to process both the predicate and the $t_{i+1}$ step, all the children of the current node need to be scanned once. The cost of this scan is captured by the average number of children of the current node multiplied by $C_{step}$, the overhead associated with processing a child step. In terms of $cost(p_i)$, in general, a predicate $p_i$ is a boolean combination of XPath expressions. Hence, $cost(p_i)$ can be estimated recursively computing the cost of the constituent XPath expressions and summing the costs together.

EXAMPLE 5

The cost for the XPath expression /a/b [c and e/f] can be estimated by essentially estimating the cost of the query root:

$$cost(a) = f(a \mid root)[cost(b) + f(^* \mid a)C_{step}]$$

$$= 1[cost(b) + 4C_{step}]$$

$$= \{f(b \mid a)[cost(c \text{ and } e/f) + f(^* \mid b)C_{step}]\} + 4C_{step}$$

$$= 3\left[cost(c \text{ and } e/f) + \frac{10}{3}C_{step}\right] + 4C_{step}$$

$$= 3[cost(c) + cost(e)] + 14C_{step}$$

$$= 3\{f(c \mid b) + f(e \mid b)[cost(f) + f(^* \mid e)C_{step}]\} + 14C_{step}$$

$$= 3\left\{\frac{8}{3} + \frac{2}{3}\left[f(f \mid e) + \frac{3}{2}C_{step}\right]\right\} + 14C_{step}$$

$$= 8 + 2\left[\frac{3}{2} + \frac{3}{2}C_{step}\right] + 14C_{step}$$

$$= 11 + 17C_{step}$$

Note that the cost computed by Eqn. 8 is for each instance of the node set matching the previous step. To obtain the total cost of traversing the suffix starting at $t_i$, the average cost $cost(t_i)$ needs to be multiplied by the cardinality $card(Q_{i-1}[p_{i-1}])$ of the nodeset from the previous step.

With respect to data partitioning cost, once more consider the XPath expression $Q = /t_0[p_0]/t_1[p_1]/ \ldots /t_i[p_i]/ \ldots /t_k[p_k]$. The cost of evaluating the XPath fragment starting at $t_i$ using data partitioning at $t_i$ over n processors can be estimated as:

$$DPcost(t_i, n) = \frac{1}{n} \cdot card(Q_{i-1}[p_{i-1}]) \cdot cost(t_i) + card(Q_{i-1}[p_i]) \cdot \quad (9)$$

$$tempResultOverhead + n \cdot C_{par}$$

Note that $DPcost_{opt}(t_i, n)$ does not take into account the cost of traversing from the beginning of the XPath expression to $t_i$.

The first pass of the optimizer does not consider the number of processors when deciding whether a particular step should be a candidate for parallelization via data partitioning. Moreover, the data partitioning cost function (Eqn. 9) is non-monotonic. Hence, the candidacy decision is made based on the optimal data partitioning cost over any number of processors:

$$DPcost(t_i) = \min_n DPcost(t_i, n) \quad (10)$$

$$n_{opt} = \text{argmin}_n DPcost(t_i, n) \quad (11)$$

With regard to the query partitioning cost, consider the XPath expression $/t_0/ \ldots /t_i[p_i]/ \ldots /t_k$. The predicate $p_i$ is a boolean combination of predicate XPath expressions of the form $p_{i,0}$ op $p_{i,1}$ op $\ldots$ op $p_{i,n-1}$, where each op can be a conjunction or a disjunction. The cost of evaluating the boolean combination of predicates associated with $t_i$ using query partitioning of the n predicates over n processors can be estimated as:

$$predQPcost(p_i) = card(Q_{i-1}[p_{i-1}]) \cdot \left[\max_{0 < j < n} cost(p_{i,j})\right] + \quad (12)$$

$$booleanOverhead(p_i) + n \cdot C_{par}$$

In fact, the boolean combination is parenthesized into a binary tree and the overhead of merging the results after the parallelized predicate XPath expressions have completed is dependent on this binary tree. The overhead is computed using the following recursive formula:

$$booleanOverhead(p) = \quad (13)$$

$$\begin{cases} 0 & \text{if } p \text{ is atomic} \\ ANDoverhead \\ [sel(lhs(p)) + sel(rhs(p))] + \\ booleanOverhead(lhs(p)) + & \text{if } Op(p) \text{ is AND} \\ booleanOverhead(rhs(p)) \\ ORoverhead \\ [sel(lhs(p)) + sel(rhs(p))] + \\ booleanOverhead(lhs(p)) + & \text{if } Op(p) \text{ is OR} \\ booleanOverhead(rhs(p)) \end{cases}$$

Note again that the query partitioning cost at step $t_i$ is computed as the average cost for each instance node matching $t_i$. Hence, the total query partitioning cost at $t_i$ needs to be computed by multiplying with the cardinality of $t_i$.

A high level multicore query plan optimizer according to one embodiment is outlined in Algorithm 1 (700) of FIG. 7. As shown, the input XPath expression (query) is first parsed into a query tree using a standard XPath parser. The optimizer then makes two passes over the query tree. In the first pass (line 3), the optimizer uses data statistics to estimate the cardinality and costs of each step in the XPath expression and identifies a set $\mathcal{P}$ of candidate points for parallelization based on local conditions. In the second pass (line 4-7), the optimizer evaluates each candidate parallelization points using heuristics that take into account global conditions, and picks the most promising parallelization point(s). Once the parallelization points have been chosen, a multi-threaded query execution plan can be constructed (line 7). We describe the two passes in greater detail now.

The first pass in the optimizer identifies candidate partitioning points in the query tree using a cost model. Each node in the query tree is traversed and evaluated using two mutually recursive procedures ANNOTATEQUERYTREE and ANNOTATEQUERYTREEPRED. Conceptually, the procedure ANNOTATEQUERYTREE iterates over each linear step of an XPath expression, while ANNOTATEQUERYTREEPRED iterates over the boolean expressions contained in predicates.

Algorithm 2 (800) in FIG. 8 outlines the logic of ANNOTATEQUERYTREE. The ANNOTATEQUERYTREE procedure takes as input the query tree for the XPath expression, a pointer to the current node in the query tree and data statistics, and returns the selectivity and the cost of the XPath fragment starting from the current node. The selectivity is used mainly in the case that the XPath fragment starting from the current node is part of a predicate. The cost is an estimate of the amount of work required to traverse the XPath fragment starting from the current node using a single thread or processor. Conceptually, the algorithm consists of four main blocks: the base case (line 3), the pre-recursion processing (line 5), the recursive call (line 20), and the post-recursion processing (line 21). The base case of the recursion occurs when all the steps in the XPath expression has been processed and the current node is pointing at the end of list, i.e., beyond the last step (line 3).

In the pre-recursion processing block (line 5), there are two cases: the current node may be a root or a step. If the current node is a root, the contribution to the overall selectivity is always 1.0 and the contribution to the cost is 0. If the current node is a step, the contribution to the selectivity is dependent on the fan-out into the current node, and the contribution to the cost is proportional to the fan-out into the current node multiplied by the cardinality of the previous node. Moreover, one or more predicates may be associated with a step. The block from line 10 to line 17 handles the predicates associated with a step. Each predicate is processed by invoking the ANNOTATEQUERYTREEPRED procedure. The ANNOTATEQUERYTREEPRED procedure returns the selectivity of the predicate, the sequential cost of processing the predicate, the cost of processing the predicate if parallelization via query partitioning is used, and the number of twigs or branches in the predicate expression. Multiple predicates associated with a step are treated as if they are AND'ed together. Hence, the combined query partitioning cost is the maximum of the query partitioning cost of each predicate, the sequential cost of processing all the predicates is simply the sum of the individual predicate costs (line 16), and the resultant selectivity is estimated using the minimum. Once the resultant selectivity has been computed, the cardinality of the current step needs to be adjusted using the selectivity of the predicates (line 18).

Line 19 adds the parallelization overhead (a tunable parameter) to the combined query partitioning cost.

In line 20, ANNOTATEQUERYTREE is called recursively on the next step in the XPath query tree. The recursive call returns the selectivity and estimated sequential cost of the XPath fragment starting from the next step.

The post recursion processing starts on line 21. The current node's contribution to the selectivity is multiplied with the selectivity from the recursive call. The current node's contribution to the sequential traversal cost is computed and incorporated with the cost from the recursive call. The procedure then evaluates whether it is feasible to parallelize the processing from the current node using either data partitioning or query partitioning. Finally, the cardinality associated with the current node is updated with the predicate selectivity and stored.

The logic of ANNOTATEQUERYTREEPRED is outlined in Algorithm 3 (900) of FIG. 9. The procedure takes as input the XPath query tree, a pointer to a predicate expression node and the data statistics, and returns the selectivity, sequential cost estimate, query partitioning cost estimate and number of twigs of the input predicate expression. If the predicate expression is a simple XPath expression, ANNOTATEQUERYTREE is called to obtain the selectivity and estimated cost. If the predicate expression is a (binary) boolean expression, ANNOTATEQUERYTREEPRED is called recursively on the left and right operands of the boolean expression. In the subsequent post recursion processing, selectivity, sequential cost estimate and query partitioning cost estimate are updated and returned.

After the first pass of the optimizer has identified the set $\mathcal{P}$ of candidate partitioning points, the second pass iterates over this set of partitioning points to pick a subset of most 'optimal' partitioning points. Recall that the first pass identifies candidate partitioning points based on local information. Hence, in the second pass, the optimizer takes into account information that is more 'global' in nature. For example, a candidate data partitioning point (e.g., 'c' in /a/b/c/d/e) identified in the first pass does not take into account the cost of processing the query XPath up to the partitioning point (e.g., /a/b). We call the query XPath up to the candidate partitioning point p the prefix prefix(p) of p.

The prefix of a partitioning point represents work that needs to be done prior to the partitioning point in question and in full generality, the prefix can also contain other partitioning points. The number of ways that the prefix of a partitioning point could be parallelized is therefore exponential in the number of partitioning points it contains and hence leads to a combinatorial explosion of the search space of all possible parallel plans. In one embodiment, we employ a greedy heuristic to deal with this problem: with respect to the partitioning point in question, we view the work associated with the prefix as sequential (not parallelized). Using this assumption, given two partitioning points, the partitioning point of which the prefix requires less traversal of the data tree is likely to result in a more efficient query plan.

The amount of traversal of a prefix can be quantified using the cost models described above. In the case where the prefixes are relatively simple XPaths without descendent axes, a simpler heuristic based on the length of the prefixes can be used. Comparing two candidate partitioning points of the same type (e.g., both DP or both QP) becomes very straightforward if the prefixes are simple XPaths: the partitioning point with a shorter prefix results in a better query plan. Note that since we assumed that no parallel processing is done for the prefix, the overall processing time for the entire XPath is limited by the processing for the prefix: no amount of parallelism at the partitioning point can reduce the time required to process the prefix.

EXAMPLE 6

Consider the XPath '/a/b/c/d[e and f and g]' and two data partitioning points at 'c' and 'd'. The partitioning point 'c' is likely to result in a better plan, because it probably takes less time to process the prefix '/a/b' sequentially than it does to process the prefix 'a/b/c'.

A similar argument can be made when comparing a data partitioning point and a query partitioning point: the less work the prefix requires the more parallelism is exposed. Given two partitioning points of which the prefixes are the same, the parallel cost (estimated according to Eqn. 11 and Eqn. 12) of processing the XPath fragment starting from the partitioning will be used to distinguish the partitioning points. The parallel cost of a query partitioning point is limited by the number of branches and hence the amount of inherent parallelism. Data partitioning, on the other hand, is less limited, because the inherent limit on parallelism is the cardinality of the partitioning point which for most real data sets and queries is much larger than the number of processors. Hence, when the estimated parallel costs of a data and of a query partitioning point are equal (or very close), the former is preferred.

Using the heuristics described previously, the optimizer sorts the set of candidate partitioning points found in the first pass and picks the top k number of candidate partitioning points. The parameter k can be chosen based on the number of available processors ('cores'). Currently, the number of cores in most multi-core processors has yet to reach the order of hundreds. Hence, in most cases, picking just one partitioning point is sufficient to produce an efficient parallel query plan. When the number of cores has reached the order of hundreds and beyond, a larger number of partitioning points can be picked.

Once the top k candidate partitioning points have been chosen by the optimizer, the next step is to construct a parallel execution plan for the input query based on these points. This is done by an algorithm that accepts as input a query tree Q and the set of partitioning points $\mathcal{P}$, and builds the parallel execution plan iteratively. At each iteration the execution plan is built by considering the partially constructed plan of the previous iteration and by applying the following operations:

It picks the next partitioning point $t \in \mathcal{P}$ and locates the position(s) of t in the partially constructed plan from the last iteration (in the first iteration, this partial plan coincides with the query tree Q). Then, if t is a data partitioning node, a new special DP node is inserted into the tree in place of t to denote that data partitioning occurs at this point. Then, the algorithm considers the subtree in the plan formerly rooted at t and creates as many duplicates of this sub-tree as the number of processors we are assigning to this partitioning point. All these sub-trees become children of the new QP node. Furthermore, to each instance of node t we add a new subtree corresponding to the predicate that defines the section of the XML document over which the query is to be executed.

In the case of query partitioning, we know that by partitioning the query at point t, we essentially rewrite Q into a set of queries whose expressions (and thus trees) differ only after step t. These differing trees of the rewritten queries become the children of a new special QP node and the new query tree rooted at QP replaces the partial plan from the previous iteration.

This concludes one iteration of the algorithm and the next partitioning point is considered. Notice that an iteration i might create multiple copies of the partitioning point at iteration i+1. Then, the above procedure must be applied to each one of these copies.

Figure 10:
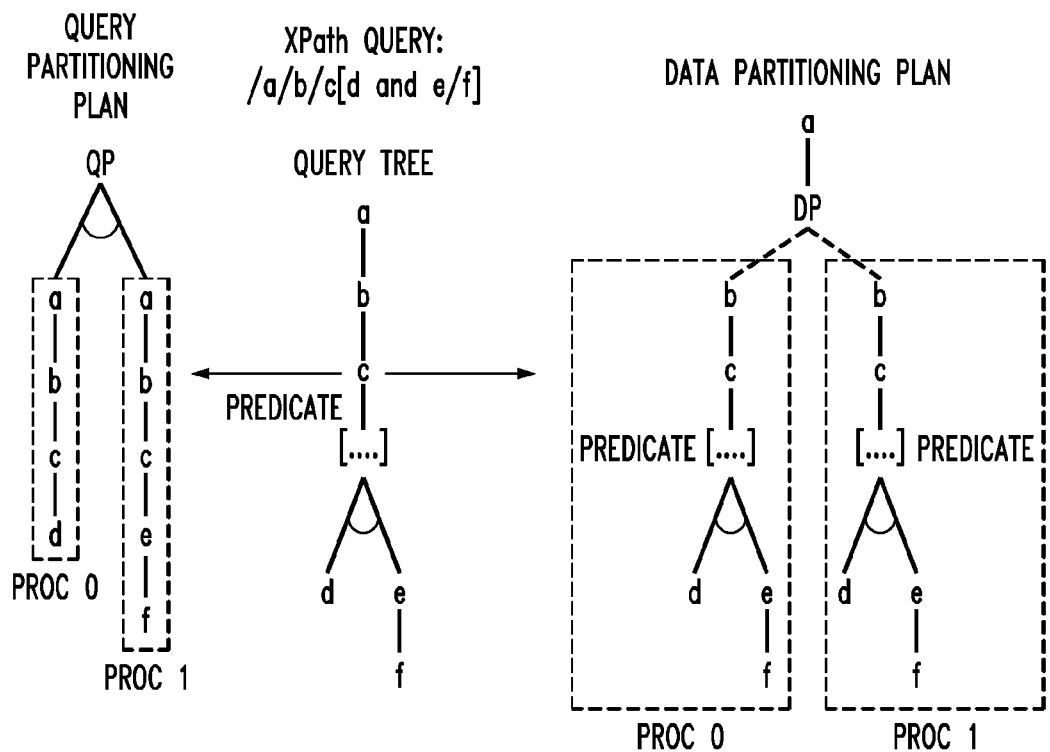
FIG. 10 shows a query tree, a plan in the case of query partitioning point, and a plan in the case of data partitioning, according to an embodiment of the invention.

As an example of the above procedure, consider FIG. 10. In the middle of the figure, we show the query tree corresponding to the query /a/b/c [d and e/f]. Assuming that step c is a candidate partitioning point, then to the left of the figure we show the plan in the case that c is a query partitioning point, while to the right of the figure we show the plan in the case of data partitioning. Notice that in the latter plan, each of the subtrees of DP has an additional predicate specifying the section of the XML document over which the query is to be executed. If an additional data partitioning point exists for step e, then, for the right branch of the left plan, node e is replaced by DP and two new subtrees for e/f are created as children of DP. For the right plan, we do a similar change in both subtrees of the (existing) topmost DP node.

Accordingly, the algorithms and techniques described above that are implemented by an optimizer of the invention may be generally described as performing a method for processing a query directed to data having a hierarchical structure with a plurality of data nodes. The method comprises: identifying one or more structural attributes describing the hierarchical structure of the data; partitioning the query into two or more query partitions using at least one of the one or more identified structural attributes; determining a parallel execution plan for the query by splitting into components one or more of: (i) the query into at least two of the query partitions; and (ii) the hierarchical structure of the data; and executing the split components in parallel on different computer processors according to the parallel execution plan.

Furthermore, in one or more embodiments, we have investigated parallelization of individual XPath queries over shared-address space multi-core processors. Unlike past approaches that have considered a distributed setting or ad hoc parallel solutions, principles of the invention provide a methodical end-to-end methodology. The inventive solution first identifies if a particular XPath query should be parallelized and then determines the optimal way of parallelizing that query. This decision is based on a cost-based approach that utilizes both on the query specifics and data statistics. At each stage of the parallelization process, we evaluate three alternative approaches, namely, data-, query-, and hybrid-partitioning. For a given XPath query, the parallel cost model uses selectivity and cardinality estimates to compute costs for these different alternatives. The costs are then fed to parallel query optimizer that generates an optimal parallel execution plan. We have implemented a prototype end-to-end parallel XPath processing system that integrates the XPath parser, cost estimator, query optimizer, and a parallel runtime library. We used this system to evaluate efficacy of the inventive solution by an extensive set of experiments using well-known XML documents. These results conclusively validate our parallel cost model and optimization framework, and demonstrate that it is possible to accelerate XPath processing using commodity multi-core systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 10, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-10, can also include, as described herein, providing a system, wherein the system includes distinct modules (e.g., modules comprising software, hardware or software and hardware). By way of example only, the modules may include: a query transformation module, a query traversing module, a candidate list constructing module, a ranking module, a selection module, a query evaluation plan formation module and a query evaluation plan execution module, so as to perform the steps of FIG. 3. By way of further examples only, the modules may alternately or additionally include one or more modules that implement the steps of algorithms 1, 2 and 3 in FIGS. 7, 8 and 9. Still further, the modules may include optimization module 202 and XML database module 205 in FIG. 2. These and other modules may be configured, for example, to perform the steps of described and illustrated in the context of FIGS. 1-10.

Figure 11:
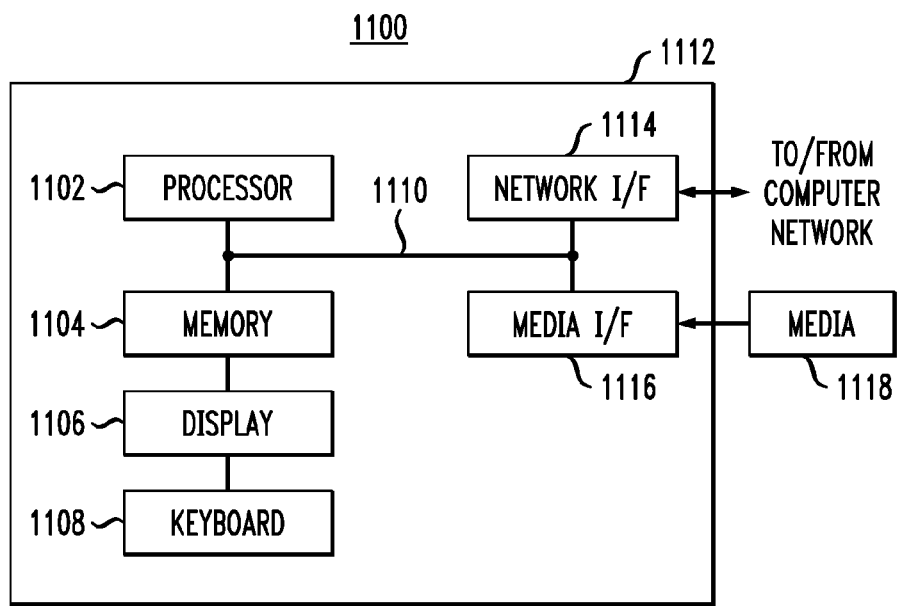
FIG. 11 shows a computer system in accordance with which one or more components/steps of the techniques of the invention may be implemented according to an embodiment of the invention.

One or more embodiments can make use of software running on a general purpose computer or workstation. With reference to FIG. 11, such an implementation 1100 employs, for example, a processor 1102, a memory 1104, and an input/output interface formed, for example, by a display 1106 and a keyboard 1108. The term "processor" as used in the context of FIG. 11 is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 1102, memory 1104, and input/output interface such as display 1106 and keyboard 1108 can be interconnected, for example, via bus 1110 as part of a data processing unit 1112. Suitable interconnections, for example, via bus 1110, can also be provided to a network interface 1114, such as a network card, which can be provided to interface with a computer network, and to a media interface 1116, such as a diskette or CD-ROM drive, which can be provided to interface with media 1118.

A data processing system suitable for storing and/or executing program code can include at least one processor 1102 coupled directly or indirectly to memory elements 1104 through a system bus 1110. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1108, display 1106, pointing device, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

It is to be understood that while the actual query execution plan is executed on the processors of the multi-core system, steps such as query/data partitioning and determining an optimal query execution plan can be executed on one or more dedicated processor devices separate from the core. However, one or more such steps can be executed by the core itself.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for processing a query directed to data having a hierarchical structure with a plurality of data nodes, the method comprising steps of:
    identifying one or more structural attributes describing the hierarchical structure of the data;
    partitioning the query into two or more query partitions using at least one of the one or more identified structural attributes;
    determining a parallel execution plan for the query by evaluation strategies comprising: a first strategy which splits the query into at least two of the query partitions; a second strategy which splits the hierarchical structure of the data; and a third strategy which splits both the query and the hierarchical structure of the data;
    selecting one of the evaluated strategies as the parallel execution plan to be executed; and
    executing the selected parallel execution plan in parallel on different computer processes.

2. The method of claim 1, wherein the computer processes comprise one or more of: a computer processor and a computer program.

3. The method of claim 1, wherein the hierarchically structured data splitting step comprises counting the number of data nodes in the hierarchically structured data for one or more node types that are referenced in the query.

4. The method of claim 3, wherein the split is controlled by an optimizing function.

5. The method of claim 3, further comprising counting the number of one or more child nodes, if any, for each data node with a node type.

6. The method of claim 3, further comprising counting the number of one or more child nodes, if any, of a child node type for each data node with a node type.

7. The method of claim 3, wherein a node type is a tag.

8. The method of claim 1, wherein the parallel execution plan splits only the hierarchical structure of the data.

9. The method of claim 1, wherein the parallel execution plan splits only the query into at least two partitions.

10. The method of claim 1, wherein the parallel execution plan splits both the hierarchical structure of the data and the query.

11. The method of claim 1, wherein the parallel execution plan comprises: one or more of: a sequential execution of the query partitions; and an execution of two or more query partitions together to obtain a result and then executing a next query partition over the result.

12. The method of claim 1, where the hierarchical structure of the data comprises one or more of: a tree structure, an XML structure, an XPath in an XML structure, a directory, an ontology, and a tree structure derived from a database.

13. Apparatus for processing a query directed b data having a hierarchical structure with a plurality of data nodes, the apparatus comprising:
    a memory; and
    one or more processor devices coupled to the memory and configured to: identify one or more structural attributes describing the hierarchical structure of the data; partition the query into two or more query partitions using at least one of the one or more identified structural attributes; determine a parallel execution plan for the query by evaluating strategies comprising: a first strategy which splits the query into at least two of the query partitions; a second strategy which splits the hierarchical structure of the data; and a third strategy which splits both the query and the hierarchical structure of the data; select one of the evaluated strategies as the parallel execution to be executed; execute the selected parallel execution plan in parallel on different computer processes.

14. The apparatus of claim 13, wherein the computer processes comprise one or more of: a computer processor and a computer program.

15. The apparatus of claim. 13, wherein the hierarchically structured data splitting operation comprises counting the number of data nodes in the hierarchically structured data for one or more node types that are referenced in the query.

16. The apparatus of claim 13, wherein the parallel execution plan splits only the hierarchical structure of the data.

17. The apparatus of claim 13 herein e parallel execution plan splits only the query into at least two partitions.

18. The apparatus of claim 13 wherein the parallel execution plan splits both the hierarchical structure of the data and the query.

19. An article of manufacture for processing a query directed to data having a hierarchical structure with a plurality of data nodes, the article of manufacture comprising a computer readable storage medium for storing a computer readable program code which, when executed by a computer, causes the computer to:

identify one or more structural attributes describing the hierarchical structure of the data;

partition the query into two or more query partitions using at least one of the one or more identified structural attributes;

determine a parallel execution plan for the query by evaluating strategies comprising: a first strategy which splits the query into at least two of the query partitions; a second strategy which splits the hierarchical structure of the data; and a third strategy which splits both the query and the hierarchical structure of the data;

select one of the evaluated strategies as the parallel execution plan to be executed; and cause execution of the selected parallel execution plan in parallel on different computer processes.

* * * * *